(12) United States Patent
Persson et al.

(10) Patent No.: US 10,875,458 B2
(45) Date of Patent: Dec. 29, 2020

(54) VEHICLE LOUNGE CONSOLE

(71) Applicant: Volvo Car Corporation, Gothenburg (SE)

(72) Inventors: Sven-Olof Persson, Mölnlycke (SE); Axel Ernstsson, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 95 days.

(21) Appl. No.: 16/254,787

(22) Filed: Jan. 23, 2019

(65) Prior Publication Data
US 2019/0248294 A1    Aug. 15, 2019

(30) Foreign Application Priority Data
Feb. 13, 2018    (EP) .................................... 18156523

(51) Int. Cl.
*B60R 7/04*    (2006.01)
*B60R 7/06*    (2006.01)
*B60R 11/00*    (2006.01)

(52) U.S. Cl.
CPC ................ B60R 7/06 (2013.01); B60R 7/04 (2013.01); *B60R 2011/0003* (2013.01)

(58) Field of Classification Search
CPC ..... B60R 7/04; B60R 7/06; B60R 2011/0003; B60R 2011/0005; B60R 2011/0007
USPC ........... 296/37.8, 37.13, 24.34, 24.37, 24.36; 224/282
See application file for complete search history.

(56) References Cited

U.S. PATENT DOCUMENTS

| | | | | |
|---|---|---|---|---|
| 1,295,232 A | * | 2/1919 | Stewart | A47F 3/10 312/125 |
| 2,301,730 A | * | 11/1942 | Mann | B60R 7/06 312/293.2 |
| 4,706,810 A | * | 11/1987 | Petrilli | B63B 49/00 108/25 |
| 5,102,181 A | * | 4/1992 | Pinkney | B60K 37/00 296/37.12 |

(Continued)

FOREIGN PATENT DOCUMENTS

| DE | 3703127 A1 | 8/1988 |
|---|---|---|
| DE | 10027373 A1 | 12/2001 |

(Continued)

OTHER PUBLICATIONS

May 28, 2018 European Search Report issue on International Application No. EP18156523.

(Continued)

*Primary Examiner* — Gregory A Blankenship
(74) *Attorney, Agent, or Firm* — Clements Bernard Walker; Christopher L. Bernard (57) ABSTRACT

There is provided a vehicle lounge console configured to be arranged in front of a vehicle passenger seat, the vehicle lounge console comprising: a storage compartment comprising a plurality of storage locations, each storage location being configured to contain a storage container; a first opening configured to receive a storage container; a second opening configured to eject a storage container; wherein the storage compartment comprises a selection mechanism configured to arrange a received storage container in a storage location, and to eject a selected one of the plurality of storage containers through the second opening upon request.

14 Claims, 7 Drawing Sheets

(56) References Cited

U.S. PATENT DOCUMENTS

| | | | |
|---|---|---|---|
| 6,185,795 B1* | 2/2001 | Shui-Shang | B25B 5/06 24/507 |
| 9,789,824 B1* | 10/2017 | Juarez Corona | B60Q 1/0082 |
| 2006/0231716 A1* | 10/2006 | Liu | B60R 7/04 248/311.2 |
| 2007/0152461 A1* | 7/2007 | Joler | B60R 7/04 296/24.34 |
| 2009/0134649 A1* | 5/2009 | Boreanaz | B60N 3/102 296/24.34 |
| 2010/0078954 A1* | 4/2010 | Liu | B60N 2/793 296/24.34 |
| 2014/0110962 A1* | 4/2014 | Bohnenberger | B60R 7/06 296/37.12 |
| 2015/0115639 A1* | 4/2015 | Sidhu | B60R 7/04 296/24.34 |
| 2016/0288684 A1* | 10/2016 | Christiansson | B60N 3/102 |
| 2017/0120832 A1* | 5/2017 | Cano | B60R 7/04 |
| 2017/0259748 A1* | 9/2017 | Siy, Jr. | B60R 7/10 |
| 2018/0162283 A1* | 6/2018 | Ranganathan | B60R 7/043 |
| 2018/0162299 A1* | 6/2018 | Ranganathan | B60R 7/04 |
| 2019/0111850 A1* | 4/2019 | Vanel | B60R 7/04 |
| 2019/0232847 A1* | 8/2019 | Kim | B60R 7/04 |
| 2019/0248294 A1* | 8/2019 | Persson | B60R 7/04 |
| 2019/0359142 A1* | 11/2019 | Hickman guevara | B60N 3/102 |
| 2020/0055631 A1* | 2/2020 | Combs | B65D 43/16 |
| 2020/0114794 A1* | 4/2020 | Hoggard | B60N 2/793 |

FOREIGN PATENT DOCUMENTS

| | | |
|---|---|---|
| EP | 3075603 A1 | 10/2016 |
| FR | 2850329 A1 | 7/2004 |

OTHER PUBLICATIONS

Mar. 9, 2020 Office Action issued in corresponding European Patent Application 18156523.5.

* cited by examiner

VEHICLE LOUNGE CONSOLE

CROSS-REFERENCE TO RELATED APPLICATION

The present patent application claims the benefit of priority of co-pending European Patent Application No. 18156523.5, filed on Feb. 13, 2018, and entitled "VEHICLE LOUNGE CONSOLE," the contents of which are incorporated in full by reference herein.

FIELD OF THE INVENTION

The present invention relates to a lounge console for a vehicle. In particular, the present invention relates to a vehicle lounge console comprising a storage compartment.

BACKGROUND OF THE INVENTION

It is becoming increasingly desirable to provide vehicles having customizable and configurable vehicle interiors in order to adapt the vehicle to the various needs of different drivers and passengers.

One previously disclosed approach is to remove the front passenger seat of a car to both provide additional legroom for a backseat passenger and to also introduce extra amenities in the space created. Such amenities may for example include a foot rest, a storage compartment for shoes, a display screen visible to the backseat passenger etc.

Such an arrangement replacing the front passenger seat can be referred to as a lounge console, and it is desirable to further develop the lounge console concept to provide additional options for the passenger.

SUMMARY

In view of the above-mentioned desired properties of a line lounge console for a vehicle, it is an object of the present invention to provide an improved vehicle lounge console for improving the passenger experience.

According to a first aspect of the invention, there is provided a vehicle lounge console configured to be arranged in front of a vehicle passenger seat. The vehicle lounge console comprises: a storage compartment comprising a plurality of storage locations, each storage location being configured to contain a storage container; a first opening configured to receive a storage container; a second opening configured to eject a storage container; wherein the storage compartment comprises a selection mechanism configured to arrange a received storage container in a storage location, and to eject a selected one of the plurality of storage containers through the second opening upon request.

By means of the present invention, items can be stored in the vehicle lounge console and brought forth upon request. Thereby, a storage space is created where the stored items are not visible, and a convenient manner of retrieving stored items is provided.

The selection mechanism of the lounge console can be considered to be motorized and remotely controlled, by the driver and/or by a passenger of the vehicle, so that a selected storage container can be provided to the passenger.

In a vehicle having two rows of seats, the lounge console is replacing the front passenger seat of the vehicle so that a passenger in the backseat both has improved legroom as well as easy access to the lounge console to receive objects stored in the storage container. In a vehicle having more than two rows of seats, the described lounge console may in principle be placed in front of any selected passenger seat.

According to one embodiment of the invention, the vehicle lounge console may further comprise a movable platform located adjacent to the second opening such that a storage container can be ejected through the second opening to the movable platform, wherein the movable platform is movable away from the second opening. Thereby, the selected storage container can be automatically transported to the passenger, increasing the passenger comfort. Moreover, by providing a movable platform, it is not required that the storage compartment itself is within easy reach of the passenger, increasing the possible configuration of the lounge console and potentially providing additional legroom for the passenger or room for other objects between the passenger and the storage compartment.

According to one embodiment of the invention, the storage compartment may advantageously comprise a revolving carousel comprising a plurality of slots, each slot configured to receive a storage container. By using a revolving carousel in the storage compartment, storage containers can easily be loaded at one location and ejected at another location. The revolving carousel is preferably located within a housing so that the carousel and the storage containers located therein are hidden from view, where access to a storage slot of the carousel is provided via the first opening of the storage compartment.

According to one embodiment of the invention, the first opening is located below the second opening. The first opening may for example be located at floor level so that it is hidden from sight. Moreover, it is also possible to provide a storage container having only one opening used to both load and eject storage containers.

According to one embodiment of the invention, the first opening may be facing in the same direction as the second opening. The first and second openings are advantageously arranged to face a passenger situated facing the vehicle lounge console. Thereby, the passenger can easily access the first opening to load storage containers into the storage compartment.

According to one embodiment of the invention, the movable platform may comprise a housing configured to receive the storage container from the storage compartment. Thereby, the storage container can be ejected from the storage compartment into the housing of the movable platform, and provided to the passenger in the housing. Moreover, the housing and the storage container can be arranged so that the contents of the storage container are accessible via an opening in the housing without removing the storage container from the housing. This makes the storage container hidden at all times, which in turn reduces the requirements on the aesthetic appearance of the storage container.

According to one embodiment of the invention, the housing may be configured to be movable in a vertical direction between a first position below a top surface plane of the platform and a second position above a top surface plane of the platform. Thereby, the housing holding the storage container can be hidden from view in the movable platform until the platform reaches the passenger, at which point the housing can slide up from the movable platform to present the contents to the passenger.

According to one embodiment of the invention, the housing may advantageously be configured to expose the contents of the storage container when in the second position. Thereby, when the housing reaches the second position above the top surface plane of the platform, depending on the configuration of the storage container, the storage container is either opened or presented so that an opening of the storage container is exposed through an opening of the housing. This brings the advantage that the storage container does not have to leave the housing for the objects within the storage container to be accessible.

According to one embodiment of the invention, the first and second openings of the storage compartment may be located below a top surface plane of the movable platform. Thereby, the openings can be obscured from view by the platform so that they are not visible to a passenger when located in a normal seat position.

According to one embodiment of the invention, the vehicle lounge console advantageously comprises at least one electrical motor configured to move the movable platform and the housing. The vehicle lounge console is provided with the number of motors needed for moving the selection mechanism of the storage compartment, the movable platform, the housing holding the storage container to be provided to the passenger as well as any other relevant functions. The skilled person realized that such electric motors may be arranged in many different ways to achieve the described functionality.

According to one embodiment of the invention, there is provided a vehicle comprising a lounge console arranged in place of a front passenger seat, and in front of a rear passenger seat of the vehicle. Moreover, the movable platform is then movable towards the rear passenger seat.

According to one embodiment of the invention, the movable platform is movable between a first position corresponding to the location of a front passenger seat of the vehicle and a second position in front of a rear passenger seat of a vehicle, such that a storage container of the movable platform is reachable by a rear seat passenger. The rear seat passenger is then located directly behind the vehicle lounge console.

According to one embodiment of the invention, the vehicle may further comprise at least one rail engaging the movable platform to slide the platform between the first position and the second position. The movable platform would thus comprise means for engaging the rail, such a corresponding rail, rollers, sliding element or any other element facilitating movement of the platform in relation to the storage compartment.

According to one embodiment of the invention, the vehicle may comprise a rail attached to a tunnel console of the vehicle and or to a floor of the vehicle. Thereby, it is possible to use one or more rails to engage the platform and facilitate the horizontal movement of the platform.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the vehicle lounge console according to the present invention are mainly described with reference to a vehicle lounge console arranged in place of a front passenger seat of a vehicle. However, other positions of the vehicle lounge console are equally possible.

Figure 1A:
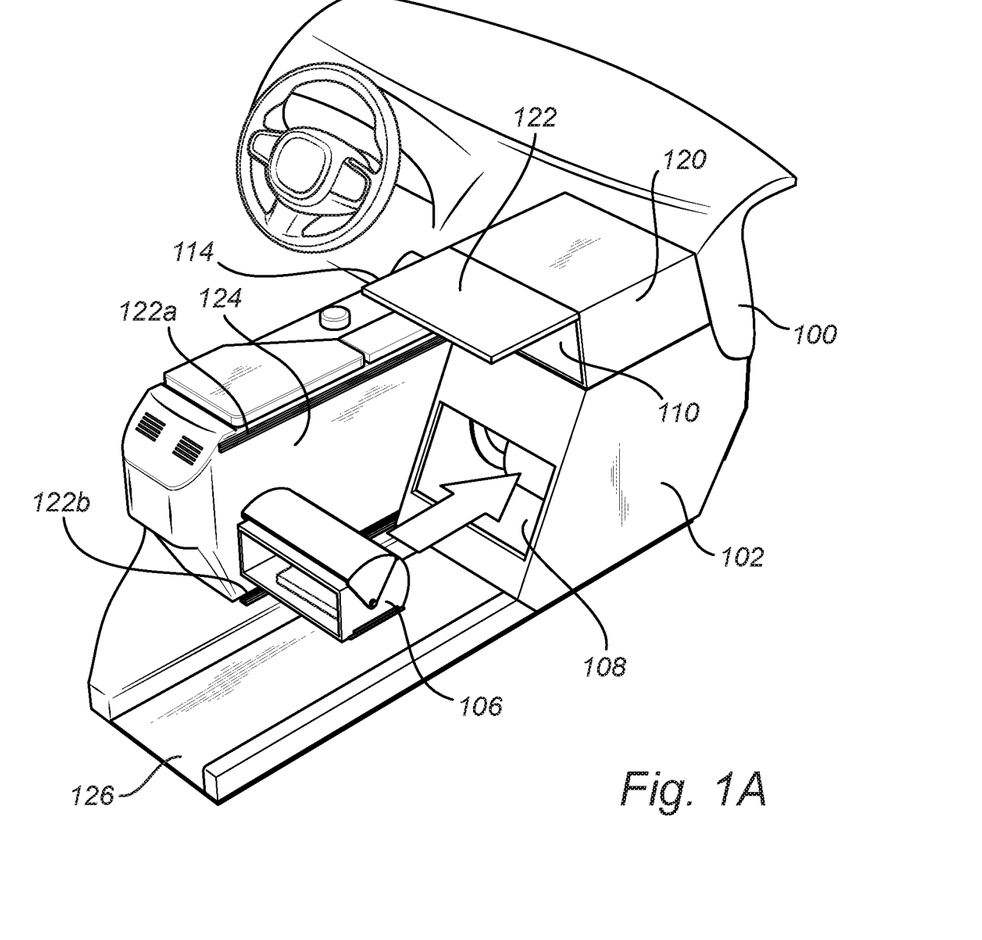
FIGS. 1A-B schematically illustrate a vehicle lounge console according to an embodiment of the invention.

FIG. 1A schematically illustrates a vehicle lounge console 100 configured to be arranged in front of a vehicle passenger seat. Here, the vehicle lounge console 100 is arranged in the place of a front passenger seat of a vehicle. The vehicle lounge console 100 comprises a storage compartment 102 comprising a plurality of storage locations, where each storage location is configured to contain a storage container 106.

The storage compartment 102 comprises a first opening 108 configured to receive a storage container 106 and a second opening 110 configured to eject a storage container 106. The first opening 108 is located near the floor 126 of the vehicle and the second opening 110 is located above the first opening 108.

Figure 1B:
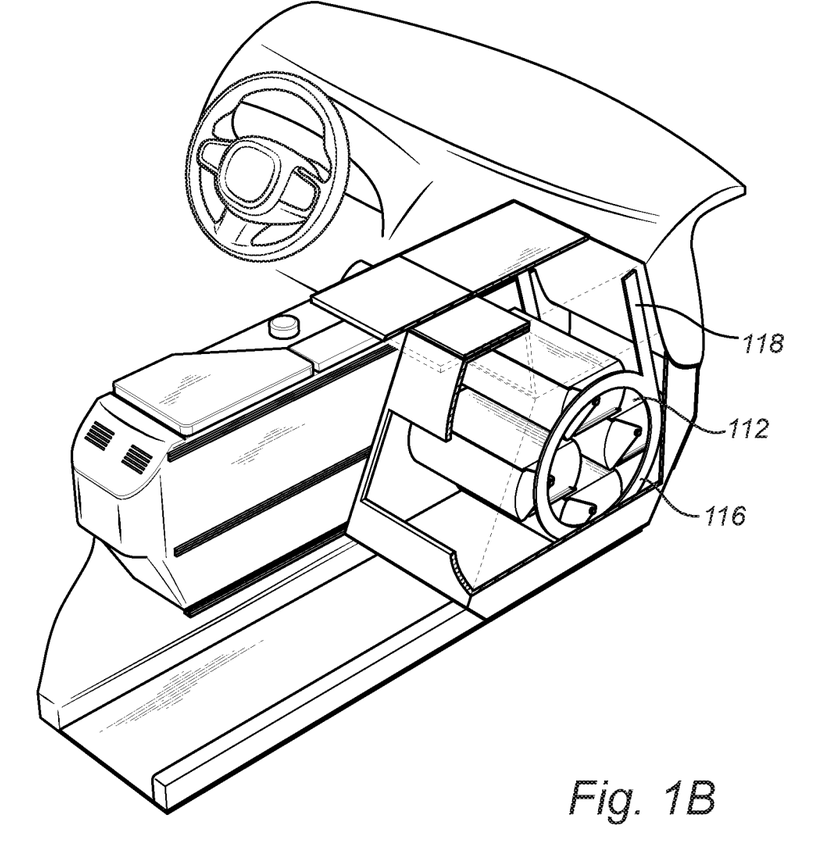

The storage compartment comprises a selection mechanism 112 configured to arrange a received storage container 106 in a storage location and to eject a selected one of the plurality of storage containers 106 through the second opening upon request. The request may come from the passenger or from the driver via a control system of the vehicle. FIG. 1B schematically illustrates the vehicle lounge console of FIG. 1A, with the interior of the storage compartment 102 exposed. Here the selection mechanism 112 can be seen which comprises rotatable carousel 116 and an arm 118 for moving the storage container 106. The storage locations are provided in the form of slots 104 in the carousel 116 where each slot is configured to hold a storage container 106. The illustrated storage containers 102 are substantially tubular with two opposing flattened sides. However, it should be noted that the storage containers may be provided in many different forms and shapes.

The illustrated vehicle lounge console 100 further comprises a movable platform 114 located adjacent to the second opening 110 such that a storage container 106 can be ejected through the second opening 110 and to a housing 120 of the movable platform 114, wherein the movable platform 114 is movable away from the second opening 110. The movable platform can for example be moved by sliding on rails 122a-b, powered by an electrical motor (not shown), where a first rail 122a is attached to the tunnel console 124 of the vehicle and a second rail 122b is attached to the floor 126 of the vehicle. It should be noted that the movable platform 114 is optional and that the lounge console can be operated without a platform. It is also possible to provide a lounge console 100 comprising a stationary platform, e.g. a table, which may be fixed or which may be a foldable table configured to pivot between a horizontal position and a vertical position.

Moreover, the described selection mechanism 112 can for example be controlled via a graphical user interface (GUI) accessible by the passenger and/or the driver. The GUI may be provided in a display in the vehicle and form part of a vehicle control and/or entertainment system. It is also possible to provide the GUI in an application on a smartphone, a tablet computer or the like. Furthermore, the storage containers 106 may be tagged or labeled in a way so that it is possible to display properties of unique storage containers in the GUI, allowing the user to select a storage container 106 having the desired content.

Figure 2A:
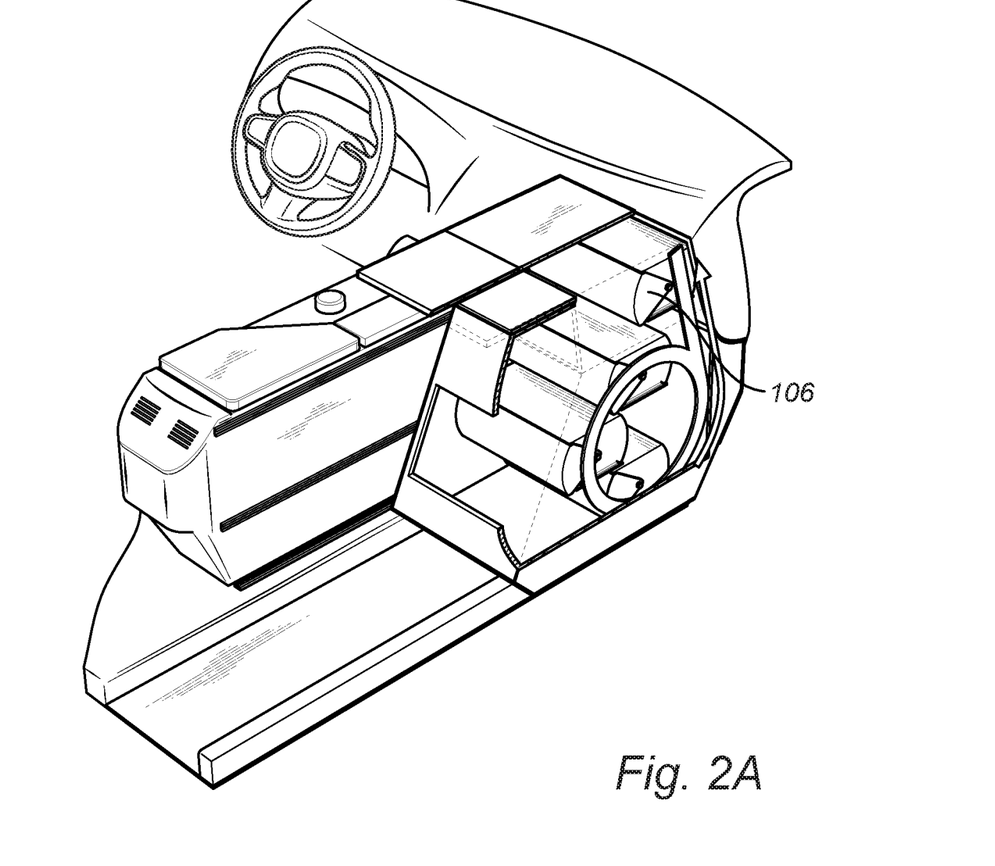
FIGS. 2A-D schematically illustrates a vehicle lounge console according to an embodiment of the invention.
Figure 2B:
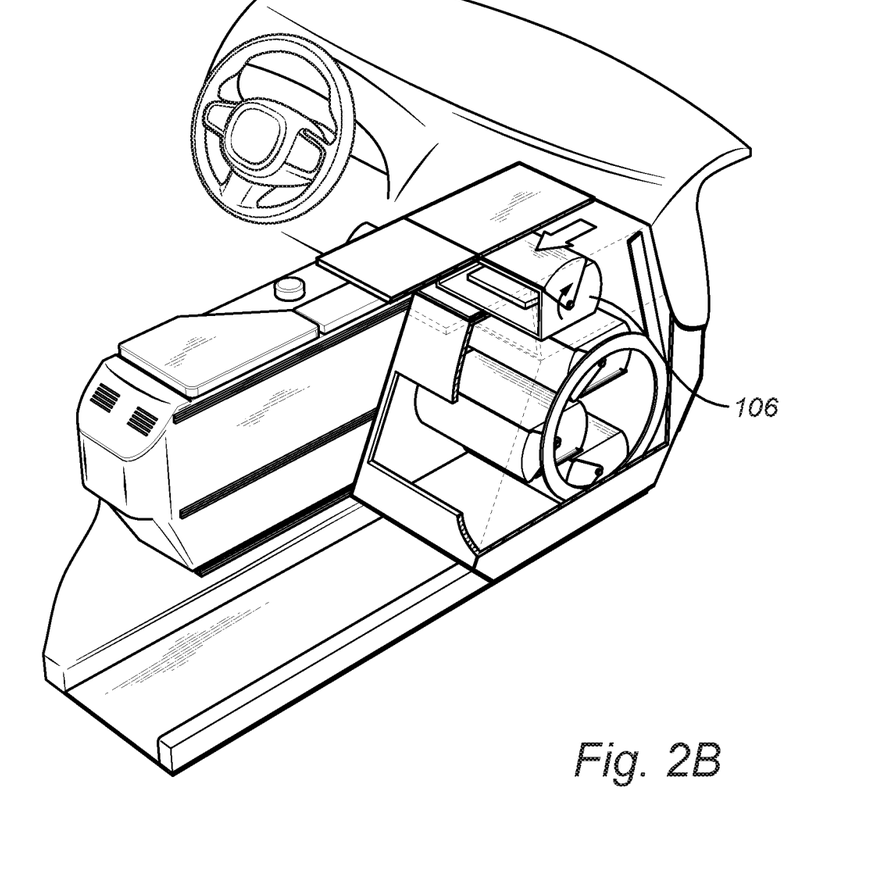

FIGS. 2A-D schematically illustrate the operation of a vehicle lounge console 100 according to an embodiment of the invention. In FIG. 2A, a storage container 106 is selected and moved from its slot 104 in the carousel by an arm 118 of the selection mechanism. The storage container 106 is subsequently ejected from the storage compartment 102 and to the housing 120 of the movable platform 114 as illustrated in FIG. 2B.

Figure 2C:
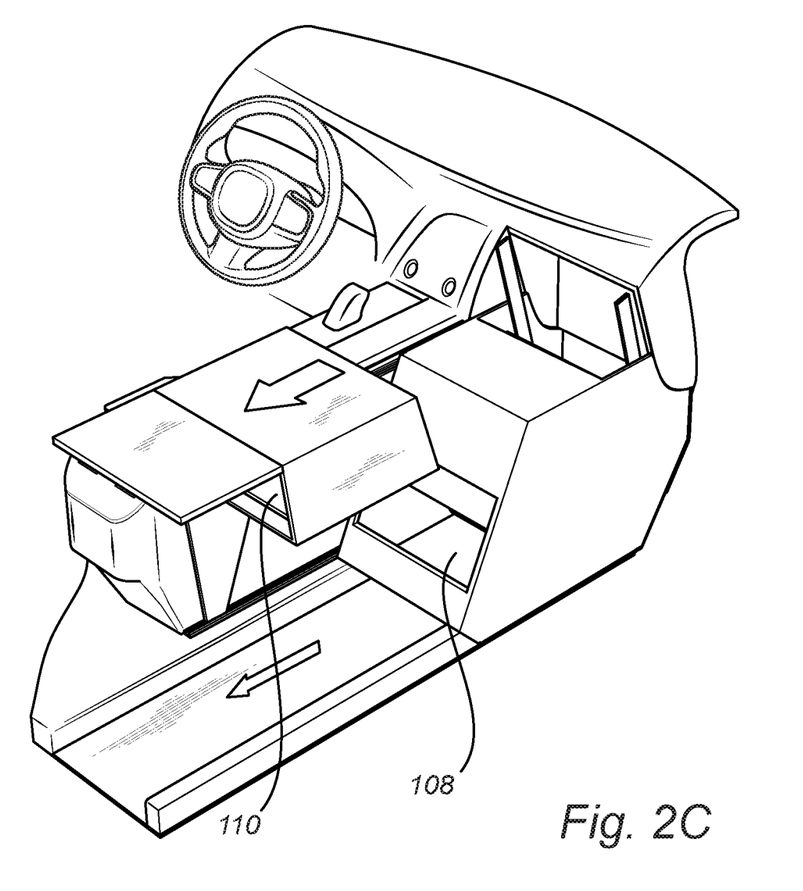
Figure 2D:
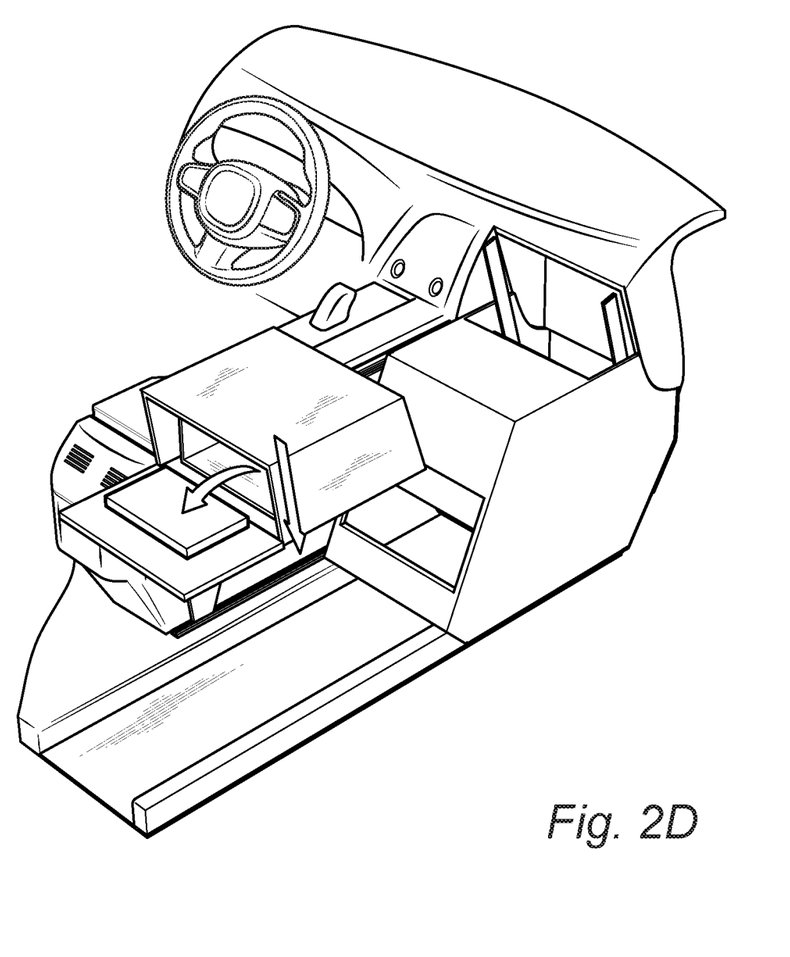

In FIG. 2C, it is illustrated that the movable platform 114 including the housing 120 holding the container 106 moves in a horizontal direction towards the rear seat of the vehicle. As illustrated in FIG. 2D, the housing 120 is movable in a vertical direction between a first position where it is located below the top surface plane 122 of the platform and a second position above a top surface plane 122 of the platform. When the housing 120 has been elevated to the second position, the contents of the storage container 106 are exposed and accessible by the passenger.

The storage container 106 may for example comprise a door or the like which is being opened as the housing 120 is elevated such that the contents of the storage container 106 are visible once the housing 120 is in its upper position.

Figure 3:
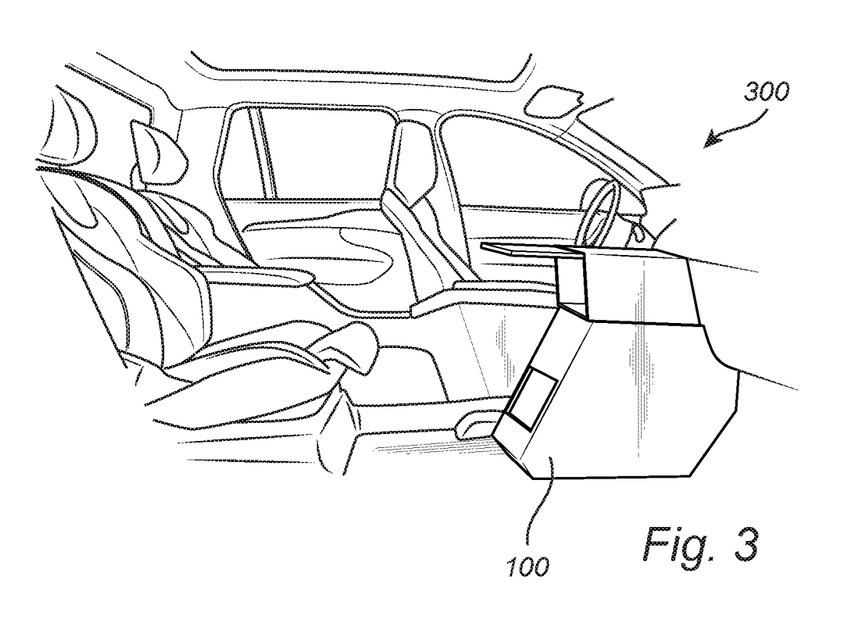
FIG. 3 schematically illustrates a vehicle comprising a vehicle lounge console according to an embodiment of the invention.

FIG. 3 schematically illustrates the interior of a vehicle 300 comprising the described vehicle lounge console 100.

Even though the invention has been described with reference to specific exemplifying embodiments thereof, many different alterations, modifications and the like will become apparent for those skilled in the art. Also, it should be noted that parts of the lounge console may be omitted, interchanged or arranged in various ways, the lounge console yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent

The invention claimed is:

1. A vehicle lounge console configured to be arranged in front of a vehicle passenger seat, the vehicle lounge console comprising:
 a storage compartment comprising a plurality of storage locations, each storage location being configured to contain a storage container;
 a first opening configured to receive a storage container;
 a second opening configured to eject a storage container; and
 a movable platform located adjacent to the second opening such that a storage container can be ejected through the second opening to the movable platform, wherein the movable platform is movable away from the second opening;
 wherein the storage compartment comprises a selection mechanism configured to arrange a received storage container in a storage location, and to eject a selected one of the plurality of storage containers through the second opening upon request.

2. The vehicle lounge console according to claim 1, wherein the storage compartment comprises a revolving carousel comprising a plurality of slots, each slot configured to receive a storage container.

3. The vehicle lounge console according to claim 1, wherein the first opening is located below the second opening.

4. The vehicle lounge console according to claim 1, wherein the first opening is facing in the same direction as the second opening.

5. The vehicle lounge console according to claim 1, wherein the movable platform comprises a housing configured to receive the storage container from the storage compartment.

6. The vehicle lounge console according to claim 5, wherein the housing is configured to be movable in a vertical direction between a first position below a top surface plane of the platform and a second position above a top surface plane of the platform.

7. The vehicle lounge console according to claim 6, wherein the housing is configured to expose the contents of the storage container when the housing is in the second position.

8. The vehicle lounge console according to claim 1, wherein the first and second openings are located below a top surface plane of the movable platform.

9. The vehicle lounge console according to claim 5, further comprising at least one electrical motor configured to move the movable platform and the housing.

10. A vehicle comprising a vehicle lounge console according to claim 1, wherein the lounge console is arranged in place of a front passenger seat, and in front of a rear passenger seat of the vehicle.

11. The vehicle according to claim 10, wherein the movable platform is movable towards the rear passenger seat.

12. The vehicle according to claim 10, wherein the movable platform is movable between a first position corresponding to the location of the front passenger seat of the vehicle and a second position in front of the rear passenger seat of a vehicle, such that a storage container of the movable platform is reachable by a rear seat passenger.

13. The vehicle according to claim 12, further comprising at least one rail engaging the movable platform to slide the platform between the first position and the second position.

14. The vehicle according to claim 12, further comprising at least one rail attached to a tunnel console and/or to a floor of the vehicle.

* * * * *